(No Model.)

J. A. GROVE.
HEDGE FENCE.

No. 437,689. Patented Oct. 7, 1890.

Witnesses
Van Buren Hillyard.
W. H. Lydick.

Inventor
J. A. Grove.
By his Attorneys

UNITED STATES PATENT OFFICE.

JOHN ARNOLD GROVE, OF BLUFFTON, INDIANA.

HEDGE FENCE.

SPECIFICATION forming part of Letters Patent No. 437,689, dated October 7, 1890.

Application filed November 27, 1889. Serial No. 331,760. (No model.)

*To all whom it may concern:*

Be it known that I, JOHN ARNOLD GROVE, a citizen of the United States, residing at Bluffton, in the county of Wells and State of Indiana, have invented certain new and useful Improvements in Hedge Fences; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hedge fences, and has for its object to provide simple and efficient means for securing the plants together. The plants are arranged in two rows and are bent from the perpendicular, the plants of one row inclining to the left and the plants of the other row to the right, forming a lattice-work, the plants being connected together at the upper points of intersection. It is not absolutely necessary that the plants be arranged in a double row, as they may be set out in a single line, each alternate plant being bent in an opposite direction to the intermediate plants.

The improvement consists in a strand between the two series of oppositely-inclined plants, and links secured to said strand and projecting laterally in opposite directions from the said strand to secure the plants in their located position and prevent their springing back to the perpendicular.

The improvement further consists in the novel features, which will be hereinafter more fully described and claimed, and which are shown in the annexed drawings, in which—

Figure 1:
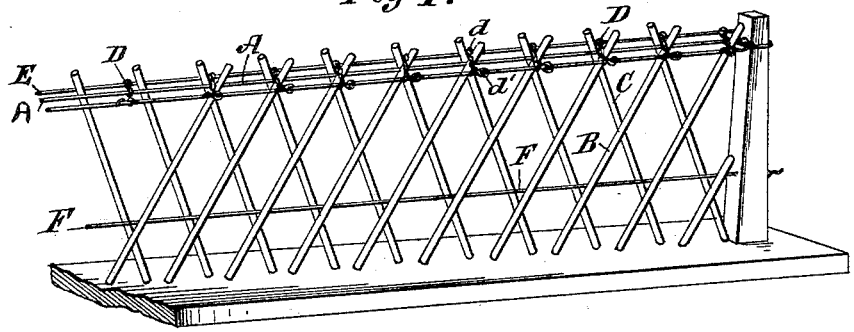
Figure 2:
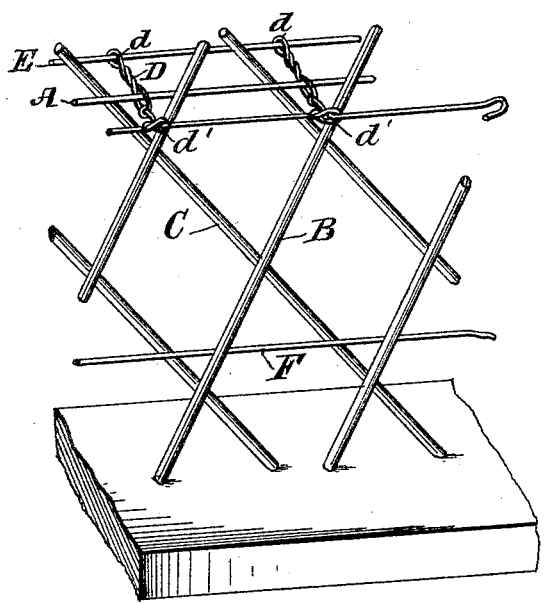

Figure 1 is a perspective view of a section of hedge fence constructed in accordance with and embodying my invention. Fig. 2 is a detail perspective view on an enlarged scale.

The strand A, which in Figs. 1 and 2 is placed between the two series of plants, is a wire suitably supported at its ends. The plants B of one series are bent in one direction and the plants C of the other series are bent in an opposite direction, the two series of plants being approximately in the same plane, and when bent form a lattice-work. The links D, secured to or engaged with the strand A, are placed at the points of intersection of the two series of plants and project laterally therefrom in opposite directions and engage with the plants on opposite sides of the strand and hold them from springing back. These links are wires, which have eyes $d$ at one end, and the other end $d'$ bent at right angles and carried back parallel with the fence and secured to the preceding link. The ends $d'$ of the links being carried back and connected, as shown, form in effect a continuous wire on one side of the fence parallel with the strand A. To further secure the links and prevent the plants from lateral displacement, a wire E is inserted through the eyes $d$ of the links. To all intents and purposes the plants are held between two exterior parallel wires, and the plants of each series are comprised between two wires—a middle and an outside wire. The wire F, near the lower part of the fence, closes the meshes between the plants.

Having fully described my invention, what I claim, and desire to secure by Letters Patent, is—

1. The hereinbefore-specified hedge fence, consisting of the plants inclined in opposite directions on parallel lines, a strand placed centrally between the oppositely-inclined plants, links or arms secured to and projected laterally from and on opposite sides of the central strand and across the paths of the plants, and secured at their outer ends, whereby the said plants are held from springing vertically or laterally, substantially as described.

2. The combination, with the oppositely-inclined plants, and a strand placed centrally between the oppositely-inclined plants, of a wire on one side of the fence parallel with the central strand, and links secured to the central strand and projected across the path of the plants on opposite sides thereof, one end of the links being secured to the said wire, and the other end being bent back parallel with the central strand and secured to the preceding links, substantially as described.

3. The combination, with the plants, of the strand A, the links having eyes at one end and having the other ends bent back and engaged with the preceding links, and the wire inserted through the eyes in the links, substantially as described.

In testimony whereof I affix my signature in presence of two witnesses.

JOHN ARNOLD GROVE.

Witnesses:
E. E. BILHEIMER,
PREMMANTES SCHWARTZ.